(12) United States Patent
Ranzinger (10) Patent No.: US 11,216,506 B1
(45) Date of Patent: Jan. 4, 2022

(54) IMAGE QUERYING TO SURFACE UNDISCOVERED IMAGES

(71) Applicant: Shutterstock, Inc., New York, NY (US)

(72) Inventor: Michael Steven Ranzinger, Boulder, CA (US)

(73) Assignee: Shutterstock, Inc., New York, NY (US)

( * ) Notice: Subject to any disclaimer, the term of this patent is extended or adjusted under 35 U.S.C. 154(b) by 194 days.

(21) Appl. No.: 15/983,038

(22) Filed: May 17, 2018

(51) Int. Cl.
*G06F 16/58* (2019.01)
*G06F 16/51* (2019.01)
*G06F 16/54* (2019.01)
*G06F 16/56* (2019.01)

(52) U.S. Cl.
CPC .......... *G06F 16/5866* (2019.01); *G06F 16/51* (2019.01); *G06F 16/54* (2019.01); *G06F 16/56* (2019.01)

(58) Field of Classification Search
CPC ...... G06F 16/51; G06F 16/56; G06F 16/5866; G06F 16/54
See application file for complete search history.

(56) References Cited

U.S. PATENT DOCUMENTS

| 6,751,343 | B1 * | 6/2004 | Ferrell | G06F 16/5838 |
| | | | | 707/E17.023 |
| 8,861,897 | B2 * | 10/2014 | Bercovich | G06F 16/5866 |
| | | | | 382/305 |
| 2009/0285492 | A1 * | 11/2009 | Ramanujapuram | G06F 16/583 |
| | | | | 382/209 |
| 2015/0186425 | A1 * | 7/2015 | Chang | G06F 16/58 |
| | | | | 707/729 |
| 2015/0206169 | A1 * | 7/2015 | Ye | G06Q 30/0242 |
| | | | | 705/14.41 |
| 2015/0370833 | A1 * | 12/2015 | Fey | G06F 16/532 |
| | | | | 707/767 |
| 2017/0097948 | A1 * | 4/2017 | Kerr | G06F 16/583 |
| 2019/0180490 | A1 * | 6/2019 | Zatepyakin | G06F 16/583 |
| 2019/0188296 | A1 * | 6/2019 | Innes | G06F 16/2425 |

* cited by examiner

*Primary Examiner* — Ashish Thomas
*Assistant Examiner* — Jedidiah P Ferrer
(74) *Attorney, Agent, or Firm* — McDermott Will & Emery LLP (57) ABSTRACT

Various aspects of the subject technology relate to systems, methods, and machine-readable media for searching and presenting undiscovered images. A system may receive a first user input specifying a search query for content from a client device. The system may initiate an image search in response to receiving the search query. The system may provide a first search result comprising a first list of images to the client device. The system may receive a second user input selecting an image from the first search result from the client device. The system may provide a second search result comprising a second list of images to the client device, based on the second user input, a similarity index, and a filtering criteria.

20 Claims, 7 Drawing Sheets

IMAGE QUERYING TO SURFACE UNDISCOVERED IMAGES

BACKGROUND

Field

The present disclosure generally relates to a computer-operated image retrieval system, and more particularly to image querying.

Description of the Related Art

An information retrieval system, such as a search engine, uses keyword searching techniques when it receives a query, such as a query for an image. The system attempts to match the terms of the query with content items from the collection that are most relevant to the query. The system ranks the images based on popularity of the image, which is based on download data associated with the image. However, such techniques discriminate against new images and images that lack sufficient download data, thereby leading to a lack of diversity in images provided to users. The discrimination against new images disincentivizes image contributors, such as photographers, and the like, from contributing new images to an image database or repository. Thereby, further exacerbating the lack of diversity in the images.

SUMMARY

The present disclosure describes a system that maps an input image to a saliency map that identifies both the contents (e.g., objects) present in an, which are identified by a relative strength at either the pixel level or over a discretized grid. This mapping can be used to identify similar images, and based on a filtering criteria, identify images that are within a certain age and image quality. This enables the user to search for images that are new and/or lack sufficient download data.

According to one embodiment of the present disclosure, a computer-implemented method is provided. The method includes receiving a first user input specifying a search query for content from a client device. The method includes initiating an image search in response to receiving the search query. The method includes providing a first search result comprising a first list of images to the client device. The method includes receiving a second user input selecting an image from the first search result from the client device. The method includes providing a second search result comprising a second list of image to the client device based on the second user input, a similarity index, and a filtering criteria.

According to one embodiment of the present disclosure, a system is provided including one or more processors and a computer-readable storage medium coupled to the one or more processors, the computer-readable storage medium including instructions. The instructions cause the one or more processors to receive a first user input specifying a search query for content from a client device. The instructions also cause the one or more processors to initiate an image search in response to receiving the search query. The instructions also cause the one or more processors to provide a first search result comprising a first list of images to the client device. The instructions also cause the one or more processors to receive a second user input selecting an image from the first search result, from a client device. The instructions also cause the one or more processors to provide a second search result comprising a second list of images to the client device, wherein the similarity index is associated with the selected image, based on the second user input, a similarity index, and a filtering criteria.

According to one embodiment of the present disclosure, a non-transitory computer readable storage medium is provided including instructions that, when executed by a processor, cause the processor to perform a method. The method includes receiving a first user input specifying a search query for content from a client device. The method includes initiating an image search in response to receiving the search query. The method includes providing a first search result comprising a first list of images to the client device. The method includes receiving a second user input selecting an image from the first search result from the client device. The method includes providing a second search result comprising a second list of image to the client device based on the second user input, a similarity index, and a filtering criteria.

According to one embodiment of the present disclosure, a system is provided that includes means for receiving, from a client device, a first user input specifying a search query for content; and means for initiating an image search in response to receiving the search query, providing a first search result comprising a first list of images to the client device; and means for receiving a second user input selecting an image from the first search result, from a client device, providing a second search result comprising a second list of images to the client device, based on the second user input, a similarity index, and a filtering criteria.

According to one embodiment of the present disclosure, a computer-implemented method is provided. The method includes receiving user input via an application on a client device to initiate an image search. The method includes providing for transmission the image search query over a connection to a server, the server including an image search service that determines one or more image identifiers, based on the search request, searches an index of images, determines a first list of images from a collection of images based on the searched index. The method includes receiving the first list of images from the server. The method includes receiving a selection of one or more images from the first list of images on the client device. The method includes providing for transmission the selection of one or more images over a connection to the server, the server determines a second listing of images based on the received selection. The method includes receiving the second list of images from the server.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. As used herein, the term "saliency" may refer to the quality by which an object within an image (e.g., a foreground object) is deemed most useful for a neural network to perform the classification task. The term "saliency map" as used herein may refer to a mapping where each pixel has an associated value with its particular saliency value, where the saliency value of a pixel may refer to as the normalized attention that the pixel has in the overall scene. The term "training data" as used herein may refer to as a set of images containing positive instances of desired classes used to train an object classifier. As used herein, the term "search term" may refer to a word in a query or portion of a query comprised of a string of text, which may be a single term or multiple terms.

General Overview

A very common workflow for a user searching for images is to issue a textual query to an IR system. The textual query generally captures their mental conception in words. The IR system generally identifies a list of images based on the terms of the textual query, and returns a set of images. Typically the IR system determines the set of images based on popularity of the images and the popularity of an image is determined based on a number of times an image has been downloaded by a user. The IR systems rely upon these images being associated with user download data and sort the set of images provided to a user based on the download data, thereby ranking images that lack sufficient download data at the bottom or failing to include such images in the set of images. Such techniques lead to a lack of diversity in the images displayed to users for a given search query. The lack of diversity in the images provided to the users hurt the users experience in discovering new images. Additionally, because these techniques rely upon download data, they further fail to display relevant images that are associated with a newly produced item, such as a newly released consumer good, until the image has been downloaded a sufficient number of times and the download data is associated with them. Furthermore, these techniques adversely affect newer images, thereby disincentivizing image contributors from providing new images to image databases or depositories.

In some implementations, the subject disclosure provides for the implementation of query-to-vector technology, where the deep-learning neural network learns how to map an arbitrary input query into a vector in the image embedding space. The subject system can use that query vector as a proxy for the class weights because the deep-learning neural network is trained to minimize the cosine distance between the image vector and the query vector. Given an image, instead of only storing a single vector for an image, the disclosed system can index a vector for each of the regions in the image, because each of those vectors can construct a saliency map for a defined class and a defined relationship between two or more objects in the image. The subject system can determine whether images are similar to a particular image and include the images or reference to the images determined to be similar within an index. Based on the index, the subject system can identify one or more images that satisfy a filtering criteria, which may specify an age for the images, thereby the subject system identifies images that are relevant and that do not have sufficient download data associated with them.

The disclosed system addresses a problem in the traditional IR systems, discovery of the most relevant images which are relatively undiscovered and newer than images that are generally identified for a given image query, which is a problem specifically arising in the realm of computer technology, by providing a solution also rooted in computer technology, namely, by considering a search engine system using an object classifier for classifying salient objects in images using a salient map of the images and identifying the relationships between these salient objects in image search results. The object classifier can classify the strength with which an image exhibits certain known objects, and relationship classifier can classify the strength with which a relationship exists between the objects. The system may use an algorithm that detects the set of objects and relationships between the set of objects from a set of example images, referred to herein as training data. The disclosed system includes training of a series of computer-operated neural networks, such as a convolutional neural network, to teach the neural network to identify features of images mapping to certain object classes and to identify relationships between the objects for identifying those images that are most relevant to an input search query that specifies a relationship between two or more objects within the image. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image, and then process those features against a number of object classes and relationship classes. The disclosed system produces a set of vectors representing the object classifications for the corpus of images in the training data. The objects identified are learned from running the convolutional neural network over a corpus of the training data. The trained convolutional neural network can provide a probability distribution where each data point in the distribution corresponds to likelihood that the image includes a corresponding object. In one or more implementations, the trained convolutional neural network provides a probability that a region of an image is salient. The disclosed system determines the probability that such training image contains a salient object based on probabilistic computations per object class for that training image. Once the convolutional neural network has been trained to predict probabilistically which features of the training images identify certain object classes, the disclosed system generates metadata for each example image indicating the salient object. In this respect, the disclosed system can then modify the original search results by incorporating items (e.g., tags, identifiers, description) that represent the salient objects for each original search result image.

The subject system provides several advantages including providing classified images. The system provides a machine learning capability where the system can learn from a content item and associated objects in order to refine search results with highly relevant content items. In this regard, the refined search results would yield content items with features that exploit the salient objects age, and/or image quality, to facilitate the user's ability to filter through the search results. With this approach, the system can continually improve its accuracy (and keep up with trending differences of what certain salient objects look like) by incorporating user interaction data into its convolution-based salient map model. By presenting results to the user, identifying the media that a user interacts with (e.g., indicating which features among other features of an image received the most attention), and examining the results that a user ignores (e.g., indicating which features among other features of an image received the least attention), the system can continually learn and refine itself to match user preferences.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes and which regions of the images are deemed salient. At runtime, the search query produces a search space that includes items representing salient regions of images based on a salient map of each subject image from original search results, thus reducing the cost of images provided for display (i.e., less bandwidth resources). Given that the subject system continues to learn and refine itself to match user preferences from a search query, modifying search results in real-time to emphasize the most salient region of each image in a listing of images reduces the system latency due to a lesser amount of time needed for a user to locate a desired search result image.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

Figure 1:
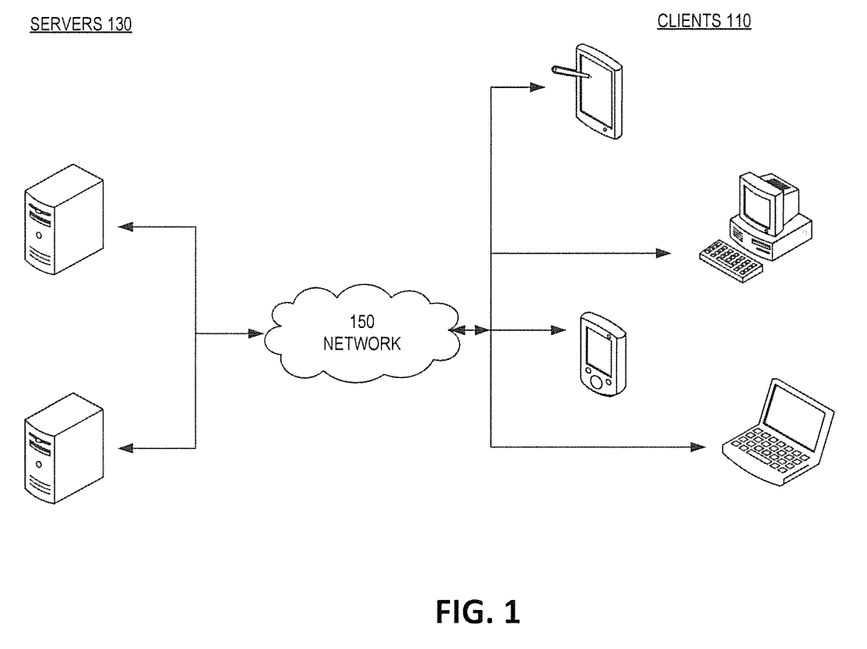
FIG. 1 illustrates an example architecture for relational image querying suitable for practicing some implementations of the disclosure.

FIG. 1 illustrates an example architecture 100 for relational image querying suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient subjects. The servers 130 can return images tagged with metadata indicating one or more salient subjects and their locations within the images to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Relational Image Querying System

Figure 2:
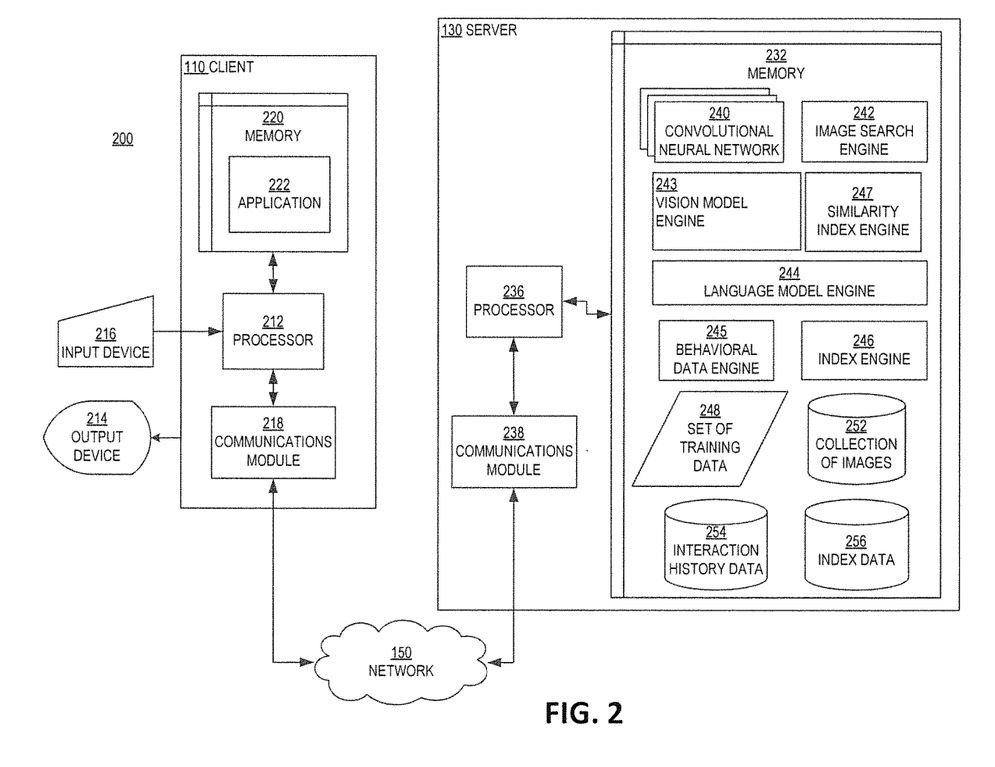
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240, an image search engine 242, a language model engine 244, a vision model engine 243, a relational model engine 247, a behavioral data engine 245 and an index engine 246.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. Examples of the architecture of the convolutional neural network 240 may be similar to the architectures of well-known image classification architectures such as AlexNet, GoogLeNet, or Visual Geometry Group models. In some implementations, the convolutional neural network 240 consists of a stack of convolutional layers followed by a single fully connected layer, which maps the convolutional features to a class of images. As described herein, a "class of images" is a group or category of images with which the image is associated. For example an image with a lemur may be associated with a primate category and/or a lemur category. In some implementations, the convolutional neural network 240 can include a layer to back propagate errors such that an error gradient of the convolutional neural network decreases or is below a threshold value. Examples of such loss layers include a softmax or hinge loss layer. By back propagating errors, the convolutional neural network 240 learns and adjusts its attention weights to better fit provided image data.

In some implementations, the final three layers of the convolutional neural network 240 includes a spatial operator layer, an average-over-width-height layer, and the fully connected layer as the classifier. The spatial operator layer may be configured to receive an input tensor of a configuration (e.g., batch size×number of feature maps×height×width), and produce an output tensor (e.g., batch size×number of new feature maps×new height×width). Examples of the spatial operator layer may include convolution, average pool, max pool, etc. The average-over-width-height layer may be configured to receive an input tensor of the configuration (e.g., batch size×number of feature maps×height×height), and produce an output tensor (e.g., batch size×number of feature maps) by averaging the values over the entire height and width of the tensor, per feature map. The fully connected layer may be configured to map the tensor of the configuration (e.g., batch size×number of feature maps), and produce a tensor (batch size×number of classes), where number of classes is based on the classification problem. To determine saliency, a vector after the averaged values from the average-over-width-height layer is obtained, and the cosine distance between the average vector against each vector (e.g., number of feature maps) from the previous spatial operator layer is then computed, thus producing a tensor of the configuration (e.g., batch size×height×width). In one or more implementations, the cosine distance between the output of the fully connected layer corresponding to a specified class and the output of the spatial operator layer is used to determine the saliency with respect to a specific class.

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes and relationships between the objects. Each of the images may include an indication of one or more salient objects present in the image based on the corresponding object classes applicable to the image, and an indication for one or more relationships between the salient objects in the image. The images may be paired with image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. In one or more implementations, each input image may be decomposed into a set of non-overlapping regions, each of which may have uniform saliency values.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class and relationships. The set of training data 248 may include multiple instances (or sets) of training data, where at least one instance (or set) of training data is associated with an intended object class. For example, the set of training data 248 may include images that include features that represent positive instances of a desired class so that the convolutional neural network 248 can be trained to distinguish between images with a feature of the desired class and images without a feature of the desired class. The set of training data 248 also may include image vector information and image cluster information. In one or more implementations, the image vector information identifies training vectors representing a large sample of training images and the image cluster information identifies clusters representing respective semantic concepts. In this respect, the vectors corresponding to a semantic concept are clustered into one cluster representing that semantic concept. In one or more implementations, a predetermined number of object classes correspond to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The behavioral data engine 245 may be a module executed by the processor 236 that is configured to monitor (and/or track) user interactions with the search results from the image search engine 242. At runtime, the behavioral data engine 245 may facilitate incorporation of the gathered feedback by logging each occurrence of the query, image, objects, relationships, and image selected. The behavioral data engine 245 may keep track of the frequency that a certain relationships between salient objects are selected or more commonly selected.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on the salient objects or regions of the most-recent images downloaded or clicked by the user. For example, the processor 236 may determine that a user interacted with an image from a search result, such as, by clicking on a segment (or region) of the image identified as salient, saving the image for subsequent access, or downloaded the image to a client (e.g., client 110), or the like. The processor 236 may keep track of the user interactions with a number of images over a given time period. In one or more implementations, the processor 236 may track the learned salient objects or regions of the last N images that the user interacted with as well as a current user query, where N is a positive integer value. The interaction history 254 may also include data indicating search behavior (and/or patterns) relating to prior image search queries.

The vision model engine 243 may be a module executed by the processor 236 that is configured to identify the most salient and prominent objects in an image and their location within the image using the convolutional neural network 240. The vision model is trained to predict which query an image is more likely to belong to given the image. Based on the architecture of the vision model, the processor 236 may obtain localization from the image. In one or more implementations, the processor 236 provides an example image to the vision model engine 243 such that the trained convolutional neural network 240 determines a saliency of each pixel in the example image with respect to an overall scene of the example image. In one or more implementations, the vision model engine 243 is configured to generate a saliency map of the example image using the trained convolutional neural network 240. For each pixel in the example image, the saliency map can provide how likely the pixel belongs to a salient object (or salient region). The vision model 243, using the convolutional neural network 240, is configured to produce feature vectors for images provided to the vision model 243 by the processor 236.

The similarity index engine 247 may be a module executed by the processor 236 that is configured to determine whether an image is similar to another image. The similarity index engine 247 can be configured to determine whether an image is similar to another image based on a comparison of feature vectors of the images produced by the vision model 243. In some implementations, the processor 236 provides one or more feature vectors of a first image produced by the vision model 243 and one or more feature vectors of a second image produced by the vision model 243 to the similarity index 247. The similarity index 247 can be configured to determine that a first image is similar to one or more other images if a difference between the feature vectors of the first image and the one or more other images is within a threshold difference. For each image determined to be similar to the first image, the similarity index engine 247 can be configured to associate the first image with each of the other images determined to be similar to the first image, referred to herein as "similarity associations," and store the similarity associations within a data storage unit in the memory 232 or a data storage unit operably coupled to the server 130.

The similarity index engine 247 can be configured to generate an index for the first image, referred to herein as "similarity index," and store each of the similarity associations of the first image as an entry within the similarity index. The similarity index may be a data structure including an array of entries, where each entry includes information relating to the image determined as similar to the first image. Each entry of the similarity index can include metadata information of the image with which the first image has a similarity association. The metadata of an image may include, but is not limited to, a date on which the image was added to an image collection or database, the number of times that image has been downloaded, the number of times a user has indicated preference for the image, and the like. In some implementations, the similarity index engine 247 can be configured to calculate an age of an image. In some implementations, the similarity index engine 247 calculates an age of an image based on the current date and the date on which the image was added to an image collection or database, which may be retrieved by the similarity index engine 247 from the metadata stored in the similarity index for that image. For example, if the date on which the image was added to an image collection or database is three weeks ago from the current date, then the similarity index engine 247, based on the current date and the date on which the image was added to an image collection or database, retrieved from the metadata stored in the similarity index for that image, may determine that the age of the image is 21 days. In some implementations, for improving search speed and/or reducing processing time, the similarity index engine 247 can be configured to update the entry of that image in the similarity index with the calculated age of the image. The similarity index engine 247 may calculate the age of the image in any time or period format, such as days, hours, minutes, seconds, and the like.

The similarity index engine 247 can be configured to include data related to a quality of the similar image relative to the first image in the entry in the similarity index that corresponds to the similar image. The quality of the image can be determined based on one or more factors, such as relevancy of the image to the first image, relevancy of the image to a search query received by the server 130, focus of the image, a focal point of the image, whether the image can evoke certain feelings within a person viewing the image, and the like. The quality of the image may be represented quantitatively using, for example, a score, a ranking, and the like.

The processor 236 can be configured to provide filtering criteria to the similarity index engine 247 and the similarity index engine 247 can be configured to limit the search of images within the collection of images to identify images similar to the first image based on the filtering criteria. The filtering criteria provided to the similarity index engine 247 can be specified based on the age of the images. Similarly, the filtering criteria may specify a threshold quality value. The filtering criteria may also be a combination of age and a threshold quality value. The similarity index engine 247 can be configured to identify images from the similarity index based on the filtering criteria. For example, if the filtering criteria specified that the age of the images is 90 days or less, then the similarity index engine 247 can be configured to search the metadata of the entries in the similarity index to identify images whose age is 90 days or less. Similarly, if the filtering criteria also specified a threshold image quality for similar images, then the similarity index engine 247 can be configured to search the metadata of the entries in the similarity index to identify images whose image quality satisfies the threshold quality specified in the filtering criteria.

The language model engine 244 may be a module executed by the processor 236 that is configured to predict an image and/or features of the image given an arbitrary input query. When training the neural language model to predict a relationship, the processor 236, using the language model engine 244, trains the neural language model first on predicting a class, by training the neural language model that a class is a set of weights against those features that the deep learning model produced as part of the vision model, which is what the neural language model would learn.

In identifying a class for an image and relationships between the object of the class and another object or aspect of the image, the neural language model is trained to learn to match the direction of the feature vector produced by the vision model (e.g., after the average-over-width-height layer of the convolution neural network 240) for an image that is highly correlated to a given class. The feature vector produced by the vision model includes data related to features of objects of the image. For example, for a given class "tree", the trained neural language model may return an arbitrary number of primary features that identify the object "tree", which corresponds to the features recognized by the vision model. For example, each of the primary features includes data values that correspond to various aspects of the object "tree." A given object (or concept) and a relationship may be represented over a number of dimensions, and the convolutional neural network 240 may be allowed to use up to D features to identify the given object, where D is a positive integer, and the object's relationship.

The index engine 246 may be a module executed by the processor 236 that is configured to index an image collection (e.g., the collection of images 252). Indexing may involve a drastic dimensionality reduction, from a native dimensionality of about 2.5 k dimensions down to 256 dimensions to keep it attractive from a storage and search standpoint. In one or more implementations, the deep learning model implements a layer that takes an image of arbitrary aspect ratio and converts the image down to a fixed size grid, by averaging neighbor areas (e.g., 5×20 aspect ratio→5×4 size grid), hence resulting in an index of downsized images. In this respect, the image vectors of the grid for each image in the image collection are indexed.

The index data 256 may be a data structure including an array of entries, where each entry includes information relating to an image and the corresponding downsized image. For example, the index data 256 may include a vector representation of the downsized image as well as associated metadata indicating one or more image identifiers and/or keywords for the image. In one or more implementations, an index compression technique is applied to the index of images. If a single vector per image is stored, where each image includes a grid of decomposed cells (e.g., 8×8 grid), then the size of the index based on a vector per image being stored translates into a very large index. Instead of storing a vector for each cell in the grid, the processor 236, using the index engine 246, may store a predetermined number of vectors that describe a subspace within the image (e.g., a vector for each primary direction of the image) based on all spatial vectors for that image using either principle components analysis (PCA) or a k-means clustering technique. The index engine 246 stores three vectors in some implementations, and stores four vectors in other implementations, but the number of vectors retained may vary depending on implementation.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

At runtime, given an arbitrary text query, the trained language model can construct a vector that matches the image that also is associated with that query. For example, the neural language model learns to construct a vector that points in approximately the same direction as the feature vectors produced by the convolutional neural network 240 in the vision model for images highly related to the given text query. The processor 236, using the image search engine 242, then takes a dot product of the vector that the neural language model generated, for every cell within the grid, across every image in the image collection (e.g., the index data 256).

The processor 236, using the image search engine 242, performs a ranking based on how well the two vectors match. In one or more implementations, the vector from the neural language model is compared to an indexed vector from the deep learning model. The comparison may determine that both vectors indicate a representation of a "lemur." For example, if the processor 236, using the image search engine 242, is analyzing the top left cell of a saliency map, and the image search engine 242 is looking for a representation of a "lemur" in that cell against the query vector, where the query vector based on the user input indicates that the representation of the "lemur" should be in a bottom-right cell, then the image search engine 242 issues a lower score than if the image search engine 242 was in the bottom-right cell looking for the representation of the "lemur". Given the scores determined using the image search engine 242, the image search engine 242 could sort or rank the set of the images to produce a search result. The processor 236 may then provide the search result to the application 222 on the client 110 over the network 150 for display by an output device 214 of the client 110.

Figure 3:
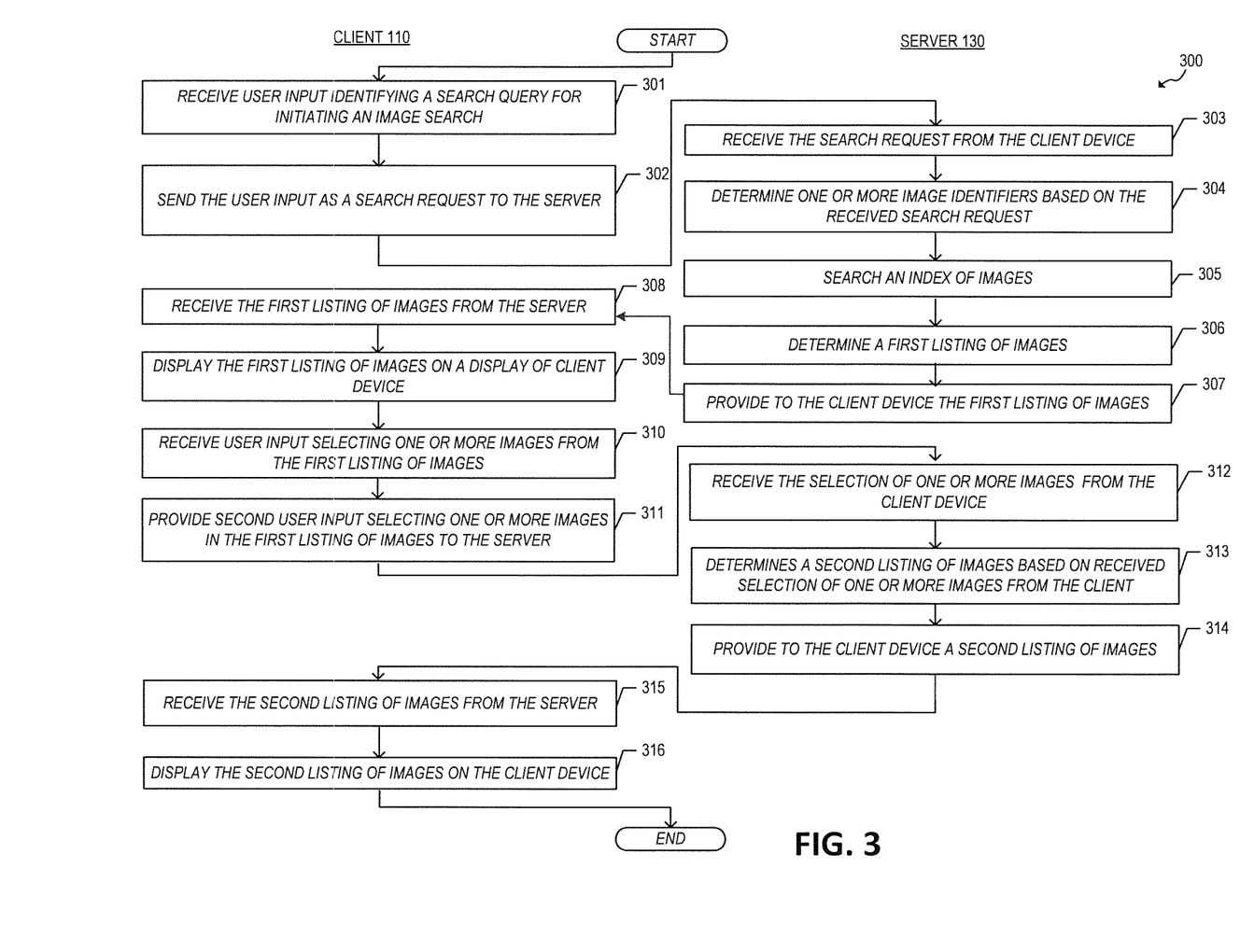
FIG. 3 illustrates an example process for content search using the example client and server of FIG. 2.

FIG. 3 illustrates an example process 300 for content search by image querying and identify similar undiscovered images using the example client and server of FIG. 2. The process 300 begins in step 301 when a user, for example, loads an application 222 on a client 110 and the client 110 receives an input from the user using the input device 216 for a search query to initiate an image search through the collection of images 252.

The input identifies one or more search queries in a given natural language for initiating the image search. In some implementations, the input may be provided within a search input page of the application 222. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member. The user can utilize the input device 216 to submit one or more search terms and localization of such terms as part of a text-based search query via a user interface of the application 222.

Next, in step 302, the application 222 on the client 110 sends the user input as a search request to the server 130 in order to receive a listing of images responsive to the text-based search query. Turning to the server 130, in step 303, the server 130 receives the search request for a listing of images from the client 110. Next, in step 304, the server 130 determines one or more image identifiers, based on the received search request. The image identifiers may correspond to an association between the search term and one or more objects identified in the image by the vision model engine 243. For example, for a search request with the search query for "pizza with a rustic background," the server 130 may determine image identifiers of "pizza rustic background," "pizza on a wooden table," "pizza brick oven," and the like. In some implementations, the server 130 generates a query vector for the search query of the search request using a trained neural language model (e.g., the language model engine 244 and the convolutional neural network 240).

Next, in step 305, the server 130 searches an index of images. The server 130 may search the index of images based on the one or more determined image identifiers and the identifiers associated with the images in the index of images. For example, images depicting a pizza on a wooden table may be associated with the identifiers "pizza rustic background," and/or "pizza on a wooden table," and the server 130, in response to a search query for "pizza with a rustic background," may search the index of images for images associated with the image identifiers "pizza rustic background" and "pizza on a wooden table." In some implementations, the server 130 searches an index of images by comparing the query vector generated for the search query of the search request using, a trained neural language model, to an indexed vector for an image. Next, in step 306, the server 130 determines a first listing of images from a collection of images (e.g., the collection of images 252) based on the searched index. In some implementations, as described above, the server 130 may determine a ranking for each image within the listing of images. In some implementations, the server 130 may order the listing of images based on the ranking of the images within the listing of the images. In step 307, the server 130 provides to the client 110 the first listing of images.

Turning back to the client 110, in step 308, the client 110 receives the first listing of images from the server 130. The first listing of images is provided for display on the client 110. Subsequently, in step 309, the client 110 displays the first listing of images on a display device of the client 110. The first listing of images may be displayed via the application 222 of the client 110. Next, in step 310, the client 110 receives an input from the user selecting one or more images from the listing of images provided for display via the application 222 of the client 110. The display of the client 110 may be configured to be a touch display and receive user input of selection of the one or more images from the listing of images. The user input of the selection of the one or more images can be received the input device 216. Next, in step 311, the client 110 provides the selection of the one or more images from the first listing of images to the server 130.

Turning back to the server 130, in step 312, the server 130 receives the selection of the one or more images from the client 110. Next, in step 313, the server 130 determines a second listing of images based on the received selection of the one or more images from the client 110. The server determines the second listing of images based on one or more similarity indexes associated with each of the one or more selected images. The server 130 may limit the second listing of images to the images that satisfy a filtering criteria. As described above, the server 130 may search the metadata of an image stored in the entries of the similarity index to identify images determined to be similar to a selected image that also satisfies the filtering criteria. As described above, images that are newly added to an image collection or database may have fewer downloads or other user behavior data associated with these images. The filtering criteria may specify an age for the images, and server 130 may determine the second listing of images by searching the metadata of the entries of the similarity index for the age of the images, and include the images in the second listing of images that satisfy the specified age filtering criteria. Thereby, the server 130 identifies images that are undiscovered by a large portion of the population or images that are relatively undiscovered when compared to the more popular images. Next, in step 314, the server 130 provides to the client 110 the second listing of images, provided for display on the client 110

Turning back to the client 110, in step 315, the client 110 receives the second listing of the images from the server 130. Subsequently, in step 316, the client 110 displays the second listing of images on a display device of the client 110. In some implementations, the second listing of images may be displayed via the application 222 of the client 110. Thus, the user is presented with images that are similar to the images that he or she may be interested in and which are relatively undiscovered, thereby improving the diversity of images available to a user for consumption.

Figure 4A:
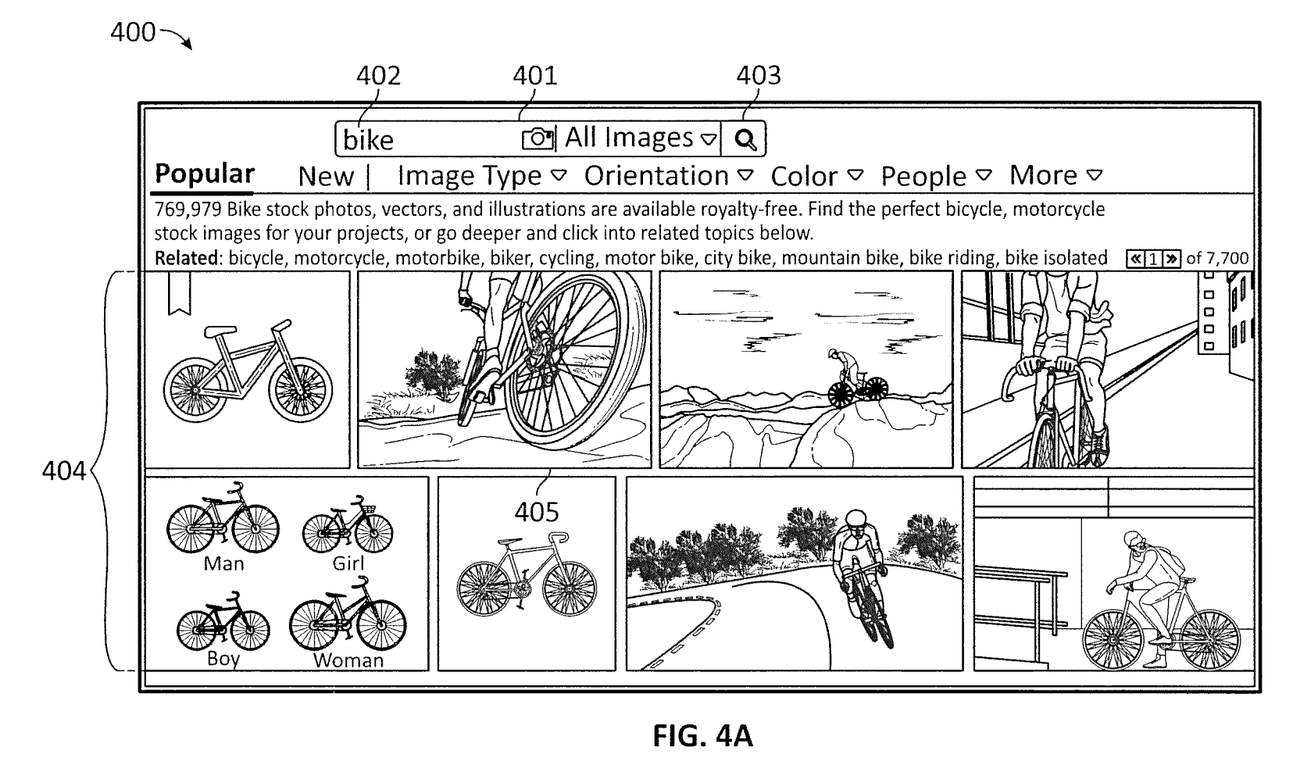
FIGS. 4A-4C illustrate example user interfaces presented to a user to receive user input and to present query results.

FIG. 3 set forth an example process 300 for content search by image querying and identifying similar undiscovered images using the example client and server of FIG. 2. An example will now be described using the example process 300 of FIG. 3 to describe how a user may be presented with a set of similar undiscovered images. An example of the client 110 is a desktop computer, a laptop computer, a smartphone, and other similar computing devices. An example of the search input page of the application 222 is a search page of a website that provides a user interface, such as a GUI, for users to input image search queries. FIG. 4A is an example screenshot of a GUI of a website that presents a search input page 400. The search input page 400 may be displayed on a smartphone of a user. The search input page 400 may include various graphical items that are configured to accept user inputs, such as a text entry box 401, which is configured to accept a search query from the user. As described above, the process 300 begins at step 301, where a user enters a search query, such as the query 402, to initiate an image search. The search query 402 is a search query that specifies that the user is interested in images that display "bike." At step 302, the search query 402 may be sent from the smartphone of the user to a server, such as server 130, in response to the user providing a command to transfer the search query, such as by clicking on the button 403.

At step 303 the server receives the search query 402 from the device used by the user to enter the search query, such as the smartphone of the user. At step 304, the server determines one or more image identifiers based on the received search request and at step 305, the server searches an index of images. At step 306, the server determines a first listing of images from a collection of images and at step 307, the server provides the first listing of images to the device used by the user to enter the search query 402. At step 308, the device used by the user to enter the search query receives the first listing of images. At step 309, the first listing of images is displayed on the device used by the user to enter the search query 402 via the application that provided the search input page 400. An example of the first listing of images is list of images 404 displayed on the search input page 400, as shown in FIG. 4A.

Figure 4B:
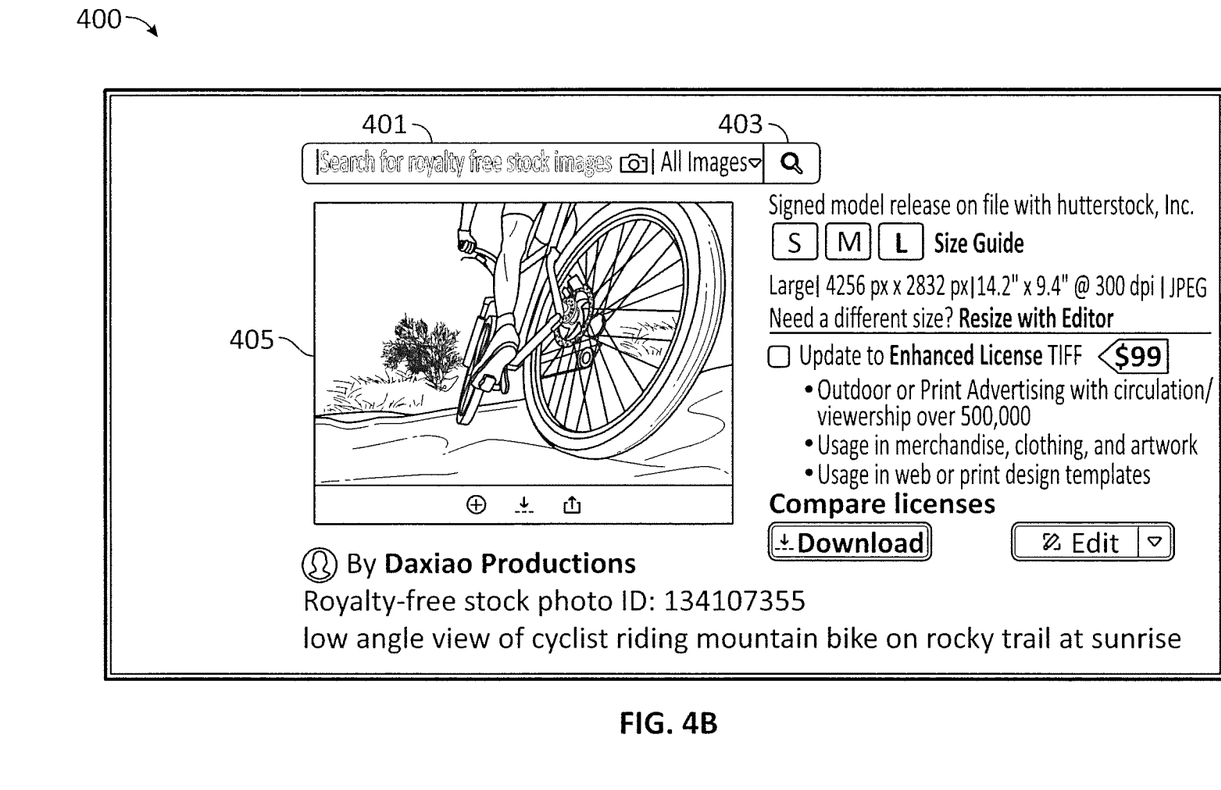
Figure 4C:
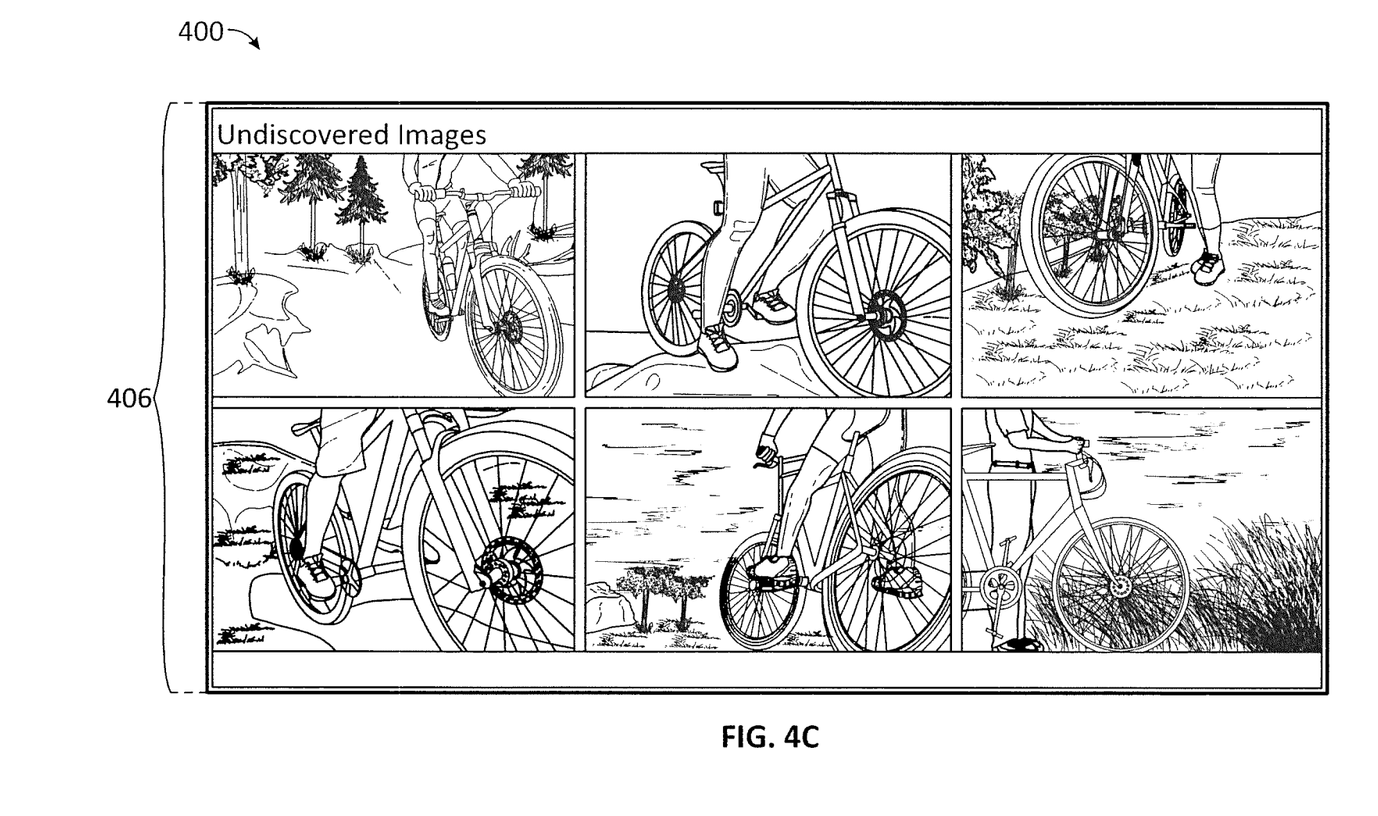

At step 310, the user selects an image from the first listing of images 404, such as image 405, and the device used by the user to enter the search query 402 receives the user input. In some implementations, the selected image 405 may be displayed in a larger size on a search input page 400, as shown in FIG. 4B. At step 311, the device used by the user to enter the search query 402 provides the server the user selection of image 405. At step 312, the server receives the selection of image 405 from the device used by the user to enter the search query 402. At step 313, the server determines a second listing of images 406 (shown in FIG. 4C) based on the received selection of the image 405, and at step 314, a second listing of images is provided to the device used by the user to enter the search query 402. At step 315, the device used by the user to enter the search query 402 receives the second listing of images 406. At step 316, the second listing of images 406 is displayed by the device used by the user to enter the search query 402. The second listing images 406 are displayed via the application that provided the search input page 400, as shown in FIG. 4C. In some implementations, the second listing of images 406 is shown on the same GUI as shown in FIG. 4B, such as displaying the second listing of images below the image 405 shown in FIG. 4B.

Hardware Overview

Figure 5:
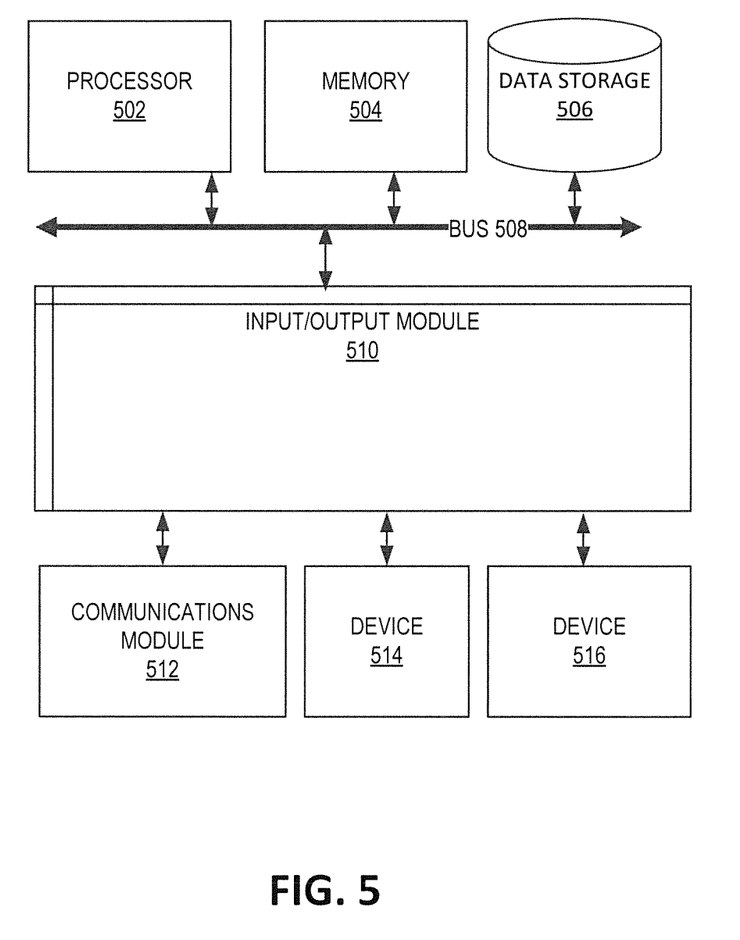
FIG. 5 is a block diagram illustrating an example computer system with which the client and server of FIG. 2 can be implemented.

FIG. 5 is a block diagram illustrating an exemplary computer system 500 with which the client 110 and server 120 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., client 110a, and server 130) includes a bus 508 or other communication mechanism for communicating information, and a processor 502 (e.g., processor 212, 252, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, output device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   receiving, from a client device, a first user input specifying a search query for content;
   initiating an image search in response to receiving the search query;
   providing a first search result comprising a first list of images to the client device;
   receiving, from a client device, a second user input selecting an image from the first search result;
   providing, based on the second user input, a similarity index, and a filtering criteria, a second search result comprising a second list of images to the client device;
   identifying multiple salient objects in one or more prior searches from the client device;
   forming a salient map linking the multiple salient objects according to a correlation strength between the salient objects;
   identifying, based on a comparison of an image vector associated with the image and each image vector associated with one or more images from a first collection of images, a second collection of images; and
   filtering the second collection of images according to:
   a time period within which each image in the second list of images was added to a data storage unit,
   a threshold image quality that is satisfied by each image in the second list of images, and
   a salient object corresponding to a most-recent prior search from the client device being associated with a salient object in one of the second collection of images in the salient map.

2. The computer-implemented method of claim 1, further comprising specifying a shorter time period to obtain an undiscovered image in the second list of images.

3. The computer-implemented method of claim 1, further comprising ranking the first list of images prior to receiving the second user input.

4. The computer-implemented method of claim 1, wherein the similarity index is associated with the image.

5. The computer-implemented method of claim 1, further comprising selecting images in the second list of images based on a saliency map indicative of a novelty of the second collection of images.

6. The computer-implemented method of claim 1, wherein the similarity index comprises an entry for each image in the second collection of images.

7. The computer-implemented method of claim 6, wherein each entry in the similarity index comprises metadata of a corresponding image in the second collection of images.

8. The computer-implemented method of claim 7, wherein the metadata of the corresponding image includes the time period within which the corresponding image was added to a data storage unit.

9. The computer-implemented method of claim 7, wherein the metadata of the corresponding image includes an image quality of the corresponding image.

10. The computer-implemented method of claim 1, further comprising:
    identifying, based on the filtering criteria, the second list of images from the second collection of images, wherein the filtering criteria comprises an increase in an image diversity in the second list of images.

11. A system comprising:
    a memory comprising instructions; and
    one or more hardware processors configured to execute the instructions to:
    receive, from a client device, a first user input specifying a search query for content;
    initiate an image search in response to receiving the search query;

providing a first search result comprising a first list of images to the client device;
receive, from a client device, a second user input selecting an image from the first search result;
provide, based on the second user input, a similarity index, and a filtering criteria, a second search result comprising a second list of images to the client device, wherein the similarity index is associated with the image;
identify multiple salient objects in one or more prior searches from the client device;
form a salient map linking the multiple salient objects according to a correlation strength between the salient objects;
identify, based on a comparison of an image vector associated with the selected image and each image vector associated with one or more images from a first collection of images, a second collection of images; and
filter the second collection of images according to:
a time period within which each image in the second list of images was added to a data storage unit,
a threshold image quality that is satisfied by each image in the second list of images, and
a salient object corresponding to a most-recent prior search from the client device being associated with a salient object in one of the second collection of images in the salient map.

12. The system of claim 11, further comprising specifying a shorter time period to obtain an undiscovered image in the second list of images.

13. The system of claim 11, further comprising ranking the first list of images prior to receiving the second user input.

14. The system of claim 11, wherein the one or more hardware processors are further configured to:
identify, based on a comparison of an image vector associated with the image and each image vector associated with one or more images from a first collection of images, a second collection of images.

15. The system of claim 11, wherein the similarity index comprises an entry for each image in the second collection of images.

16. The system of claim 15, wherein each entry in the similarity index comprises metadata of a corresponding image in the second collection of images.

17. The system of claim 16, wherein the metadata of the corresponding image includes a time period within which the corresponding image was added to a data storage unit.

18. The system of claim 17, wherein the metadata of the corresponding image includes an image quality of the corresponding image.

19. The system of claim 14, wherein the one or more hardware processors are further configured to:
identify, based on the filtering criteria, the second list of images from the second collection of images.

20. A non-transitory machine-readable storage medium comprising machine-readable instructions for causing a processor to execute a method, comprising:
receiving, from a client device, a first user input specifying a search query for content;
initiating an image search in response to receiving the search query;
providing a first search result comprising a first list of images to the client device;
receiving, from a client device, a second user input selecting an image from the first search result;
providing, based on the second user input, a similarity index, and a filtering criteria, a second search result comprising a second list of images to the client device;
identifying multiple salient objects in one or more prior searches from the client device;
forming a salient map linking the multiple salient objects according to a correlation strength between the salient objects;
identifying, based on a comparison of an image vector associated with the image and each image vector associated with one or more images from a first collection of images, a second collection of images from the second list of images; and
filtering the second collection of images according to:
a time period within which each image in the second list of images was added to a data storage unit,
a threshold image quality that is satisfied by each image in the second list of images, and
a salient object corresponding to a most-recent prior search from the client device being associated with a salient object in one of the second collection of images in the salient map.

* * * * *